Aug. 14, 1951     J. S. PAGE     2,564,171
SAFETY DEVICE
Filed June 11, 1946
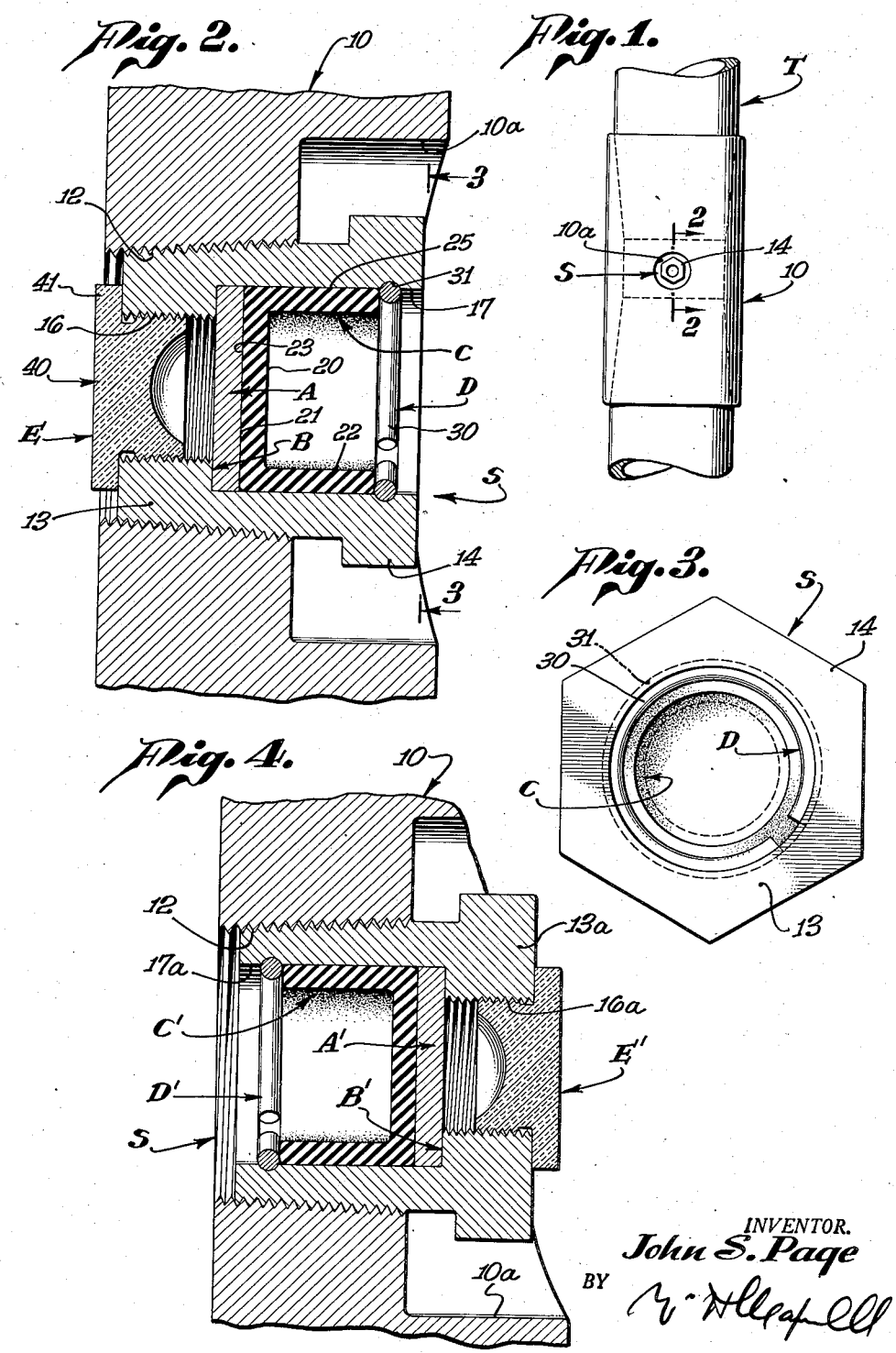
INVENTOR.
John S. Page
BY
ATTORNEY Patented Aug. 14, 1951

2,564,171

UNITED STATES PATENT OFFICE 2,564,171

SAFETY DEVICE

John S. Page, Long Beach, Calif., assignor to Page Oil Tools Inc., Long Beach, Calif., a corporation of California Application June 11, 1946, Serial No. 675,963

4 Claims. (Cl. 220—89)

This invention has to do with a safety device or safety plug of the break disc type for use in connection with vessels or elements handling fluid pressure, and it is a general object of the invention to provide an improved simple effective and dependable safety device particularly useful in connection with structures or elements such as tanks, fluid handling vessels, fluid operated tools, etc.

Safety plugs of the break disc type have been long used in connection with fluid pressure operated devices or in connection with elements handling fluid pressure, and the usual device of this type involves a break disc of suitable strength held on a seat by a clamp ring, or the like, and the seal established by means of a washer, or the like, maintained tight between the disc and its seat or against the front side of the disc by the clamp ring. Safety devices of the type mentioned are not altogether satisfactory since they are always subject to leakage, this being due primarily to the fact that the washer employed, no matter how it is arranged, has no self sealing action but rather depends upon mere pressure or clamping action which holds both the washer and the disc. Leakage may occur in such an arrangement when the structure is subject to vibration or strain, or when it is subject to shrinkage or expansion due to changes in temperature. Furthermore, leakage in such a device may occur when there is the slightest shrinkage, aging, or deterioration of the washer.

It is a general object of my present invention to provide a safety device of the break disc type which involves a self-sealing means or sealing element which does not depend for its sealing action upon clamping pressure such as I have referred to above.

Another object of my present invention is to provide a safety device of the general character referred to which involves a sealing means that acts effectively and dependably and does not require great skill or accuracy in the original setting or application as is the case where a break disc is sealed by means of the usual washer arrangement. In the structure that I have provided I have eliminated entirely the necessity for a clamp means to bear upon the sealing element and the sealing element that I have provided acts effectively quite regardless of the manner in which the disc itself may be mounted or held.

A further object of my invention is to provide a safety device of the general character referred to involving a sealing element which acts to seal in the desired manner when merely inserted into operating position and which involves a retainer for the sealing element which is very simple and which serves to prevent accidental displacement of the sealing element.

It is a further object of my invention to provide a sealing device of the general character referred to which includes a protective means at the back of the sealing disc which means acts to prevent failure of the disc in the event of surge or momentary back pressure such as is encountered in some hydraulic or fluid pressure handling structures.

The various objects and features of my invention will be fully understood from the following detailed description of typical preferred forms and applications of my invention, throughout which description reference is made to the accompanying drawings, in which:

Fig. 1 is a view showing a portion of a well tool subject to fluid pressure and showing the safety device of my invention applied thereto. Fig. 2 is an enlarged detailed sectional view taken as indicated by line 2—2 on Fig. 1. Fig. 3 is a view taken as indicated by line 3—3 on Fig. 2 and Fig. 4 is a view similar to Fig. 2 showing another form of the invention.

My present invention is primarily concerned with a safety device of the break disc type and it is of such character that it can be used to advantage in connection with various devices, structures or elements handling or subject to fluid pressure. For instance, it can be used to advantage in connection with cylinders or flasks employed to handle liquids or gases under pressure or it can be used in connection with tanks, cylinders or like vessels handling or subject to fluid pressure, or it can be used in connection with tools subject to fluid pressure as for instance in connection with oil well tools. In the drawings I have, for sake of example, shown my present invention applied in typical manners to an element to be used in a well and which element is subject to fluid pressure. In Fig. 1 I have shown a portion of a well tool T involving a cylindrical body 10 and the safety device S of my invention is applied to the body 10 within a recess 10ᵃ. In Figs. 2 and 3 I show a form of the invention wherein the safety disc employed in the device is subject to failure when excessive pressure is applied to the exterior of the body or element 10 while in Fig. 4 of the drawings I show a form wherein the safety disc is subject to failure when excessive pressure is applied to the interior of the body or element 10.

In accordance with the broader principles of my invention I provide a safety disc A to be supported on a seat B and I provide a seal or sealing means C that acts to prevent leakage past or around the disc A. In practice I may employ, in addition to the parts named, a retainer D for the seal C and a protector E for the disc A which elements I will hereafter describe in detail.

In carrying out my invention I may provide the disc supporting seat B directly in the element subject to pressure. For example, directly in a part such as the body 10 of tool T. However, I prefer to employ the general type of construction used in safety devices of the break disc type, that is, I prefer to provide an opening 12 through the element or body 10 which is subject to pressure and I apply a plug 13 to the opening 12 which plug has a passage through it which passage is normally closed or obstructed by the break disc A. In the case illustrated I show the plug 13 threaded into the opening 12 and I show a plug construction proportioned so that a portion of the plug projects beyond the exterior of the body 10 where the plug is provided with a head 14 formed and shaped to be engaged by a suitable operating tool. The particular head illustrated is polygonal in cross section so that it can be conveniently engaged by a wrench and it projects far enough from the exterior of the body 10 to facilitate easy manipulation of the plug in the course of applying it to or removing it from the opening 12. It is to be observed that I have provided a tapered opening 12 and plug 13 so that the plug can be tightened into the opening so that there is no danger of leakage between these parts.

The passage through the plug 13 may be termed an escape passage since it allows escape of fluid when the break disc A fails, and in practice it may be formed and proportioned in various manners. In accordance with the preferred form of my invention the passage through the plug is formed by establishing two bores in the plug, a small bore 16 that extends into the plug from one end and a large bore 17 that extends into the plug from the other end. At a point within the plug or intermediate its ends the seat B occurs where the bores 16 and 17 join. Where the device is to fail under pressure from the exterior of the member 10 the small bore 16 enters the plug from its inner end while the large bore 17 enters the plug from its outer end with the result that the seat B faces outwardly in the plug. It will be apparent that by establishing the desired differential in size between the bores 16 and 17 the desired fit or a seat necessary to hold the disc A can be established.

The break disc A may be an ordinary suitable break disc such as is commonly employed in devices of this general type, that is, it may be a simple plain or flat disc of material, say for instance, sheet metal or cast metal, or of any other suitable material having its thickness related to its size so that it fails when subject to a predetermined pressure. In accordance with my invention I preferably apply the break disc A directly to the seat B so that there is direct bearing engagement between these parts as shown in the drawings, and I make the disc A of a size or diameter so that it will slidably fit into the opening 17 so that it can be conveniently slid into operating position.

The seal C which I have provided involves, primarily, a disc-shaped body of sealing material which I will term a bottom 20 that preferably bears against the outer side 21 of the disc A, and an annular part or side wall 22 which projects outwardly from the bottom 20. I prefer to form the bottom 20 and side wall 22 of the seal C integrally so that these parts together form a cup-like element and, in accordance with my invention I form these parts of a conformable or elastic material, preferably rubber or a rubber-like composition. I make the exterior 23 of the bottom 20 so that it seats on or bears against the outer side 21 of the disc A and I make the exterior 25 of the side wall 22 cylindrical and smooth and so proportioned relative to the large bore 17 as to fit snugly therein. In fact, I prefer to proportion the seal to the bore 17 so that it fits tight enough to require some pressure for insertion into operating position, as shown in the drawings. When in operating position the fit of the seal in the bore 17 establishes an initial or normal sealing engagement between the side wall 22 and the bore 17. Because of the cup-shaped construction or formation of the seal C pressure on the seal admitted through the bore 17 serves to press the bottom 20 of the seal tight against the disc A thus communicating the pressure to the disc A tending to push the disc out through the small bore 16. Such pressure on the seal acts radially outward on the wall 22 forcing the wall into tight sealing engagement with the wall of the bore 17, thus preventing leakage through the structure. It will be apparent that as pressure increases on the seal the wall 22 is merely pressed tighter in the bore 17 while the bottom 20 presses against the disc A until finally the disc fails, at which time the bottom 20, being without the support of the disc, likewise fails, to the end that the passage is open through the plug allowing escape of pressure.

The retainer D that I prefer to employ may be any suitable means that acts to prevent accidental displacement of the seal C from the bore 17, although in many cases the mere tight fit of the seal in the bore may be sufficient to hold it in place, making a retainer unnecessary. The preferred form of retainer, as illustrated in the drawings, involves a split ring 30 carried in a groove 31 provided in the wall of bore 17 outward of the side wall 22 of the seal C or between the end of wall 22 and the entrance to the bore 17. The simple snap ring that I have illustrated is inexpensive and can be easily applied and yet serves as an effective means to retain the seal in place.

The protective means E may or may not be used, as circumstance require. I provide the protective means E at the inner end of the passage through the plug or at the side of the safety disc opposite to that at which the seal C is located. The protective means acts mainly to prevent surge of fluid or a reverse pressure that would cause excess pressure on the inner side of the disc A from dislodging the disc A from the seat B. It is to be observed that with my construction the sealing disc A might be dislodged from seat B in the event excess pressure developed on the disc A through the small bore 16. To eliminate such a hazard I preferably provide the means E which may be in the form of a closure for the bore 16. In the case illustrated the means E involves a plug 40 carried in the bore 16 and having a head 41 bearing on the inner end of the plug 13. As I have illustrated the plug may be screw threaded into the bore 16. The plug 40 and its head may be integrally formed and may be formed of a material that will fail under high pressure or under a given pressure. For instance, in practice this part of the structure may be formed of a plastic or composition such as a hard rubber composition or the like. By constructing the means E in the manner illustrated it will be apparent that it is effective in checking excess or abnormal pressure that might otherwise dislodge the disc A and yet it will not interfere with escape of fluid through the structure when the disc A fails. It is to be understood that the plug 40 is made of a material or is so mounted that it fails or is dislodged when the disc A fails by reason of pressure entering the structure through the bore 17.

In the form of the invention shown in Fig. 4 the various parts that I have referred to are present except that the arrangement is reversed, that is, I show an arrangement wherein the small bore 16a in the plug 13a enters the plug from the head end rather than from its inner end, while the large bore 17a enters the plug 13a from the inner end rather than from the head end. In this arrangement the seat B' faces the inner end of the plug instead of the head end of the plug and, consequently, the disc A' seats outwardly in the plug instead of inwardly therein. The means A, B and C in this case may be identical with that above described as well as the means D and the means E if they are employed. In this form of the invention the action of the structure is the same as that above described except of course that the disc A is subject to failure upon a predetermined pressure entering the plug 13a from its inner end rather than from its outer end.

Having described only typical preferred forms and application of my invention, I do not wish to be limited or restricted to the specific details herein set forth, but wish to reserve to myself any variations or modifications that may appear to those skilled in the art and fall within the scope of the following claims:

Having described my invention, I claim:

1. In a structure of the character described an element subject to pressure and having an opening therethrough with pressure on one end thereof, there being a seat in the opening facing in the direction from which the pressure is exerted, a break disc carried by the seat and held thereon by said pressure, and an expansible cup shaped seal carried in the opening supported on the pressure side of the disc and having a side part held in sealing engagement with the wall of the said pressure opening.

2. In a structure of the character described an element subject to pressure and having an opening therethrough with such pressure at one end thereof, there being a seat in the opening facing said end of the opening, a break disc carried by the seat, a cup shaped seal carried in the opening having a disc-shaped bottom supported on the disc and having an expansible cylindrical side wall having sealing engagement with the wall of the opening, and a retainer holding the seal in the opening.

3. A device of the character described including a plug for holding pressure and having a small outlet bore extending into it from its pressure holding end and a large inlet bore extending into it from the other end establishing a seat in the plug intermediate its end, a break disc arranged in the large bore to be supported by the seat and subject to pressure admitted by the large bore, and a seal slidable in the large bore and subject to pressure admitted by the large bore and having a sealing portion held in sealing engagement with the wall of the large bore by pressure acting toward the seat.

4. A device of the character described including a plug having a small bore extending into it from one end and a large bore extending into it from the other end establishing a seat in the plug intermediate its end, a break disc arranged in the large bore to be supported by the seat, and a cup shaped rubber seal in the large bore having a bottom bearing on the disc and a sealing side wall held in sealing engagement with the large bore by pressure acting toward the seat.

JOHN S. PAGE.

REFERENCES CITED

The following references are of record in the file of this patent:

UNITED STATES PATENTS

| Number | Name | Date |
| --- | --- | --- |
| 1,493,638 | Leighton | May 13, 1924 |
| 1,579,141 | Pierce | Mar. 30, 1926 |
| 1,606,831 | Ford | Nov. 16, 1926 |
| 2,178,686 | Gerrgiev et al. | Nov. 7, 1939 |
| 2,215,566 | Schoof | Sept. 24, 1940 |
| 2,437,836 | Santiago | Mar. 16, 1948 |